A. E. IRONS.
SEAL.
APPLICATION FILED SEPT. 16, 1911.

1,037,010.  Patented Aug. 27, 1912.

INVENTOR
A. E. Irons

UNITED STATES PATENT OFFICE.

ARCHIE E. IRONS, OF PITTSBURGH, PENNSYLVANIA.

SEAL.

1,037,010.  Specification of Letters Patent.  Patented Aug. 27, 1912.

Application filed September 16, 1911. Serial No. 649,596.

*To all whom it may concern:*

Be it known that I, ARCHIE E. IRONS, a citizen of the United States of America, residing at Pittsburgh, in the county of Allegheny and State of Pennsylvania, have invented certain new and useful Improvements in Seals, of which the following is a specification, reference being had therein to the accompanying drawing.

This invention relates to seals, and more particularly to that type commonly styled self-fastening seals or "snap seals" used for the securing of doors or covers of meters, cabinets, compartments and the ends of straps or ribbons, and has for its object to provide a seal of such class, in a manner as hereinafter set forth, with means capable of indicating if the seal has been tampered with.

Further objects of the invention are to provide a seal which is comparatively simple in its construction and arrangement, strong, durable, efficient for its use, readily set up and comparatively inexpensive to manufacture.

With the above and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claim hereunto appended.

In the drawings:—Figure 1 is a vertical sectional view of the seal, Fig. 2 is a plan of a detached washer, Fig. 3 is a cross sectional view of the same, Fig. 4 is a plan of a detached gripping washer, Fig. 5 is a cross sectional view of the same, Fig. 6 is a vertical sectional view of a detached plunger constituting the renewable unit or element of the seal, Fig. 7 is a vertical sectional view of a modified form of plunger, Fig. 8 is a similar view of another modified form of plunger, Fig. 9 is a cross sectional view of a head adapted to form part of the plunger illustrated in Fig. 8, Fig. 10 is a plan of the head, Fig. 11 is a vertical sectional view of a modified form of seal, Fig. 12 is a plan of a cap adapted to form part of the modified form of seal, and Fig. 13 is a plan of a washer adapted to provide a temporary identification.

A seal in accordance with this invention comprises a renewable unit and a permanent unit. The renewable unit is in the form of a plunger having a cylindrical stem 1, a cylindrical head 2 at the outer end thereof, and a nose 3 at the inner end thereof. This plunger is made of glass or other frangible material and embedded in the plunger is a metallic reinforcement, as a wire or rod 4, said wire extending from the outer side of the head 2 to the end of the nose 3. The stem 1, adjacent to the head 2, is provided with an annular groove 5, whereby the head 2 can be easily broken or severed from the stem 1. The stem 1, adjacent to the nose 3, has an annular groove providing an annular shoulder 6 and the purpose of this shoulder will presently appear.

The permanent unit or element of the seal is made of metal and comprises a circular housing 7 containing a flat washer 8 and a gripping washer 9. The peripheral edges of these washers are retained within the housing 7 by the flanged edges 10 of said housing, and said washers, together with the outer side of the housing 7, have concentric vertically alining openings 11, 12 and 13. The gripping washer 9 is provided with circumferentially arranged equally spaced openings 14, and said washer has radially disposed slits 15 extending from the opening 12 to the openings 14. These slitted portions of the washer provide tongues 16 that have the inner ends thereof bent downwardly, as at 17 to engage the annular shoulder 6. The washer 9 is made of a resilient metal whereby the tongues 16 can readily yield as the plunger is placed in the openings 11, 12 and 13, said tongues springing into engagement with the annular shoulder 6 immediately upon being released by the nose 3. The washer 8 prevents the gripping washer of the permanent element from being tampered with. The opening 11 of said washer simply provides clearance for the stem 1 and prevents an instrument from being inserted in the permanent element to shift the tongues 16 out of engagement with the shoulder 6. The washer 8 also prevents the tongues 16 from being bent upwardly during the manipulation of the seal. It is upon this washer and head 2 that a permanent identification can be placed, for instance, the name of the firm using the seal or that of the manufacturer.

In Fig. 7 of the drawing, there is illustrated a modification of the renewable unit of the seal, wherein the plunger 1ª is made of metal or other durable material and coated or provided with an exterior cover of enamel or a frangible material, which would be injured and could be readily detected should an attempt be made to surreptitiously open the seal. The plunger 1ª, adjacent to the head thereof, has an annular groove 1ᵉ, whereby the head can be easily broken or clipped from the end of the plunger. In some instances, this plunger can be made of a diameter that will permit of the head being easily broken from the same.

Another modification of the plunger element of the seal is illustrated in Figs. 8, 9 and 10 of the drawing, wherein the stem 1ᵇ is made of metal or other durable material and one end thereof enlarged, as at 18 and the opposite end provided with a nose 3ª. This stem is finished or coated, as at 19 similar to the plunger 1ª, and said stem is adapted to receive a circular head 20 having a central tapering opening 21 to receive the enlarged end 18 of the stem 1ᵇ, said enlarged end seating in the opening 21 and the stem 1ᵇ and the head 20 serving functionally the same purpose as though the stem had an integral head. The head 20 is made of glass or other fragile material, and after said head has been broken, the stem 1ᵇ can be easily withdrawn from the permanent element of the seal.

Reference will now be had to Figs. 11 and 12 illustrating another modification of the invention, wherein the renewable unit or element is designated 22 and the permanent unit 23. Associated with these units is a permanent cup-shaped cap 24 having the top thereof provided with two diametrically opposed openings 25 and a central opening 25ª providing clearance for the plunger. The ends of a wire or cord 26 can be threaded through the openings 25 and the openings 27 provided therefor in the structure 28 to be sealed or locked together by the wire or cord. The ends of the wire or cord 26 can be twisted or tied together within the cap 24 or wrapped around the stem of the renewable element 22. The permanent element can then be snapped into engagement with the renewable element and access cannot be had to the ends of the wire or cord for releasing the structures 28 sealed thereby. The permanent cup-shaped cap 24 telescopes the permanent element 23 and fully protects the connected ends of the wire or cord 26.

In Fig. 13 of the drawing I have illustrated a washer 30 that can be made of celluloid, cardboard or any inexpensive material, and upon this washer can be placed a temporary identification mark. The washer is placed upon the plunger beneath the head 2 and this washer will indicate when the seal was placed or sealed and last inspected. The renewable element in either instance can be made of various colors or with various shaped heads in order to designate the character of the seal or the character of the structure in connection with which it is used.

It is apparent from the foregoing that the permanent member can be repeatedly used and easily and quickly snapped on to the renewable element, and that when said renewable element is made of a frangible material, the head 2 can be easily broken from the stem 1 to permit of the renewable element or stem 1 being shifted from the permanent element. When the renewable element has the stem and head thereof made of metal or frangible material, the head cannot be removed unless it is broken or clipped from the stem, and such an attempt could be detected on account of the enamel or frangible coat of the renewable element being injured. It is therefore obvious that the renewable element in either instance is susceptible to injury that can be detected.

What I claim is:—

A seal comprising a renewable element constructed of a material susceptible to detectable injury and including a shank having a head at one end capable of being readily separated therefrom and cut away at its other end to provide a peripheral annular shoulder, a permanent element including a housing having a flanged upper portion and its lower portion formed with an opening, a washer mounted in said circular housing and having a centrally disposed opening, and a gripping washer positioned in the housing below said flat washer and provided with a centrally disposed opening and a plurality of tongues capable of engaging said shoulder to prevent the withdrawal of said shank, said shank when said head is separated therefrom capable of being removed from said permanent element by shifting the shank through said permanent element in the direction of entry of said shank into the permanent element, said washers maintained in said housing by the flange of the latter.

In testimony whereof I affix my signature in the presence of two witnesses.

ARCHIE E. IRONS.

Witnesses:
KARL H. BUTLER,
MAX H. SROLOVITZ.